US010030361B2

(12) United States Patent
Hijikata et al.

(10) Patent No.: US 10,030,361 B2
(45) Date of Patent: Jul. 24, 2018

(54) CONSTRUCTION MACHINE

(71) Applicant: Hitachi Construction Machinery Co., Ltd., Taito-ku, Tokyo (JP)

(72) Inventors: Seiji Hijikata, Tsukuba (JP); Kouji Ishikawa, Kasumigaura (JP); Takatoshi Ooki, Kasumigaura (JP); Shinya Imura, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 167 days.

(21) Appl. No.: 15/119,879

(22) PCT Filed: Apr. 3, 2014

(86) PCT No.: PCT/JP2014/059886
§ 371 (c)(1),
(2) Date: Aug. 18, 2016

(87) PCT Pub. No.: WO2015/151263
PCT Pub. Date: Oct. 8, 2015

(65) Prior Publication Data
US 2017/0058487 A1 Mar. 2, 2017

(51) Int. Cl.
*F16D 31/02* (2006.01)
*E02F 9/12* (2006.01)
(Continued)

(52) U.S. Cl.
CPC ............ *E02F 9/123* (2013.01); *E02F 9/2091* (2013.01); *E02F 9/2217* (2013.01); (Continued)

(58) Field of Classification Search
CPC ........ F15B 21/14; E02F 9/2091; E02F 9/2217
(Continued)

(56) References Cited

U.S. PATENT DOCUMENTS 8,659,177 B2 * 2/2014 Fujishima ............... F15B 21/14
290/1 R
9,200,430 B2 * 12/2015 Kawasaki ............. E02F 9/2217
(Continued)

FOREIGN PATENT DOCUMENTS

JP 2000-136806 A 5/2000
JP 2009-281525 A 12/2009
(Continued)

OTHER PUBLICATIONS

International Preliminary Report on Patentability (PCT/IB/338 & PCT/IB/373) issued in PCT Application No. PCT/JP2014/059886 dated Oct. 13, 2016, including English translation of document C2 (Japanese-language Written Opinion (PCT/ISA/237)) previously filed on Aug. 18, 2016 (5 pages).
(Continued)

*Primary Examiner* — Michael Leslie
(74) *Attorney, Agent, or Firm* — Crowell & Moring LLP

(57) ABSTRACT

A controller sets a target flow rate of a regenerative hydraulic motor at zero or a low flow rate within an extent in which hydraulic pressure in a regeneration hydraulic line does not become negative pressure when a detected pressure PS detected by a pressure sensor is lower than a first set value previously set by overload relief valves, sets the target flow rate of the regenerative hydraulic motor at a value corresponding to the detected pressure when the detected pressure is higher than or equal to the first set value, and controls the revolution speed of a generator/motor in such a manner that a flow rate through the regenerative hydraulic motor equals the target flow rate. With such features, excellent operability equivalent to that in the conventional technology can be secured.

6 Claims, 5 Drawing Sheets

(51) Int. Cl.

| | |
|---|---|
| ***F15B 21/14*** | (2006.01) |
| ***E02F 9/22*** | (2006.01) |
| ***E02F 9/20*** | (2006.01) |
| ***F15B 11/08*** | (2006.01) |
| ***F15B 13/02*** | (2006.01) |
| *F15B 21/08* | (2006.01) |
| *E02F 3/32* | (2006.01) |

(52) U.S. Cl.
CPC .......... *E02F 9/2228* (2013.01); *E02F 9/2285* (2013.01); *E02F 9/2289* (2013.01); *E02F 9/2296* (2013.01); *F15B 11/08* (2013.01); *F15B 13/024* (2013.01); *F15B 21/14* (2013.01); *E02F 3/32* (2013.01); *E02F 9/2292* (2013.01); *F15B 21/087* (2013.01); *F15B 2211/20546* (2013.01); *F15B 2211/6313* (2013.01); *F15B 2211/7058* (2013.01); *F15B 2211/88* (2013.01)

(58) Field of Classification Search
USPC ............................................................ 60/414
See application file for complete search history.

(56) References Cited

U.S. PATENT DOCUMENTS

| | | | | |
|---|---|---|---|---|
| 9,284,718 | B2 * | 3/2016 | Hijikata .................. | F15B 21/14 |
| 9,394,670 | B2 * | 7/2016 | Hijikata .................. | F15B 21/14 |
| 9,574,328 | B2 * | 2/2017 | Hijikata .................. | F15B 21/14 |
| 9,863,124 | B2 * | 1/2018 | Ishihara .................. | F15B 21/14 |
| 2012/0245782 | A1 | 9/2012 | Kawasaki et al. | |

FOREIGN PATENT DOCUMENTS

| | | | |
|---|---|---|---|
| JP | 2011-202457 | A | 10/2011 |
| JP | 2013-160251 | A | 8/2013 |

OTHER PUBLICATIONS

International Search Report (PCT/ISA/210) issued in PCT Application No. PCT/JP2014/059886 dated Jul. 1, 2014 with English translation (3 pages).
Japanese-language Written Opinion (PCT/ISA/237) issued in PCT Application No. PCT/JP2014/059886 dated Jul. 1, 2014 (3 pages).

* cited by examiner

CONSTRUCTION MACHINE

TECHNICAL FIELD

The present invention relates to a construction machine, and in particular, to a construction machine including a hydraulic actuator, such as a hydraulic excavator, that regenerates energy of hydraulic fluid discharged from the hydraulic actuator.

BACKGROUND ART

Energy recovery devices that regenerate hydraulic fluid energy by driving a hydraulic motor with return hydraulic fluid returning from a swing hydraulic motor, performing power generation by an electric motor directly connected to the hydraulic motor, and storing the generated electric energy in a battery are described in Patent Literatures 1 and 2, for example.

Further, Patent Literature 2 describes a method for controlling the tilting angle of a regenerative hydraulic motor such that pressure necessary for the braking of the swing hydraulic motor is maintained at the time of the hydraulic fluid regeneration, as a control method for the energy recovery device.

PRIOR ART LITERATURE

Patent Literature

Patent Literature 1: JP-2000-136806-A
Patent Literature 2: JP-2009-281525-A

SUMMARY OF THE INVENTION

Problem to be Solved by the Invention

However, Patent Literature 1 does not disclose a concrete control method for controlling the flow rate of the return hydraulic fluid recovered by the energy recovery device (hereinafter referred to as a "recovery now rate"). Thus, if the flow rate through the regenerative hydraulic motor is adjusted to an excessively high level and exceeds the discharge flow rate from the swing hydraulic motor, for example, there is a possibility that the swing braking pressure drops and the operability deteriorates.

On the other hand, the energy recovery device described in Patent Literature 2 controls the recovery flow rate by the tilting angle control, but responsiveness of the tilting angle control is low. Therefore, in the swing deceleration in which the discharge flow rate from the swing hydraulic motor decreases gradually, for example, the recovery flow rate might exceed the discharge flow rate from the swing hydraulic motor due to response delay. Also in this case, there is a possibility that the swing braking pressure drops and the swing operability deteriorates.

The object of the present invention, which has been made in consideration of the above-described problems, is to provide a construction machine that regenerates the energy of the hydraulic fluid supplied/discharged to/from the swing hydraulic motor and is capable of securing excellent operability equivalent to that in the conventional technology.

Means for Solving the Problem (1) To achieve the above object, the present invention provides a construction machine including: a swing structure; a swing hydraulic motor that rotationally drives the swing structure; a regeneration device including a regeneration hydraulic line connected to a pair of actuator hydraulic lines for supplying and discharging hydraulic fluid for the swing hydraulic motor, a regenerative hydraulic motor connected to the regeneration hydraulic line, and a generator/motor that rotates together with the regenerative hydraulic motor; a pressure detection device capable of detecting at least a pressure on a high-pressure side of the pair of actuator hydraulic lines; overload relief valves connected to the actuator hydraulic lines; and a control unit that sets a target flow rate of the regenerative hydraulic motor at zero or a low flow rate within an extent in which hydraulic pressure in the regeneration hydraulic line does not become negative pressure when the detected pressure on the high-pressure side of the pair of actuator hydraulic lines detected by the pressure detection device is lower than a first set value previously set by the overload relief valves, sets the target flow rate of the regenerative hydraulic motor at a value corresponding to the detected pressure when the detected pressure is higher than or equal to the first set value, and controls a revolution speed of the generator/motor in such a manner that a flow rate through the regenerative hydraulic motor equals the target flow rate.

In the present invention configured as above, when the pressure in the actuator hydraulic lines is lower than the first set value previously set by the overload relief valves, the flow rate through the regenerative hydraulic motor reaches zero or a low flow rate within an extent in which hydraulic pressure in the regeneration hydraulic line does not become negative pressure. When the pressure in the actuator hydraulic lines is higher than or equal to the first set value, the flow rate through the regenerative hydraulic motor is controlled to coincide with the target flow rate by the revolution speed control of the generator/motor having high responsiveness. Therefore, the pressure in the actuator hydraulic lines is maintained like that in the conventional construction machines and excellent operability equivalent to that in the conventional technology can be secured.

(2) Preferably, in the above construction machine (1), the control unit sets the target flow rate when the detected pressure is higher than or equal to the first set value by simulating an override characteristic of the overload relief valves.

With such features, the flow rate through the regenerative hydraulic motor is controlled to be equivalent to or higher than the relief flow rate of the overload relief valve, by which the regeneration efficiency of the hydraulic fluid energy can be increased.

(3) Preferably, in the above construction machine (2), the control unit sets the target flow rate of the regenerative hydraulic motor at a constant value when the detected pressure is higher than or equal to a second set value that has been set higher than the first set value.

With such features, the flow rate through the regenerative hydraulic motor is controlled to be constant when the pressure in the actuator hydraulic lines is higher than or equal to the second set value that has been set higher than the first set value. Therefore, pressure fluctuations in the actuator hydraulic lines caused by flow rate fluctuation in the regenerative hydraulic motor can be suppressed.

(4) Preferably, in any one of the above construction machines (1)-(3), the construction machine further includes a selector valve that is arranged in the regeneration hydraulic line, establishes communication through the regeneration hydraulic line when the pressure on the high-pressure side of the pair of actuator hydraulic lines is higher than or equal to a third set value that has been set equivalent to or lower than the first set value, and blocks the regeneration hydraulic line when the pressure on the high-pressure side of the pair of actuator hydraulic lines is lower than the third set value.

With such features, when the regeneration device fails and the regenerative hydraulic motor cannot maintain pressure, the regenerative hydraulic motor is disconnected from the actuator hydraulic lines. Thus, even in failure of the regeneration device, the pressure in the actuator hydraulic lines is maintained like that in the conventional construction machines and excellent operability equivalent to that in the conventional technology can be secured.

Effect of the Invention

According to the present invention, excellent operability equivalent to that in the conventional technology can be secured in a construction machine that regenerates the energy of the hydraulic fluid supplied/discharged to/from the swing hydraulic motor.

MODE FOR CARRYING OUT THE INVENTION

Figure 1:
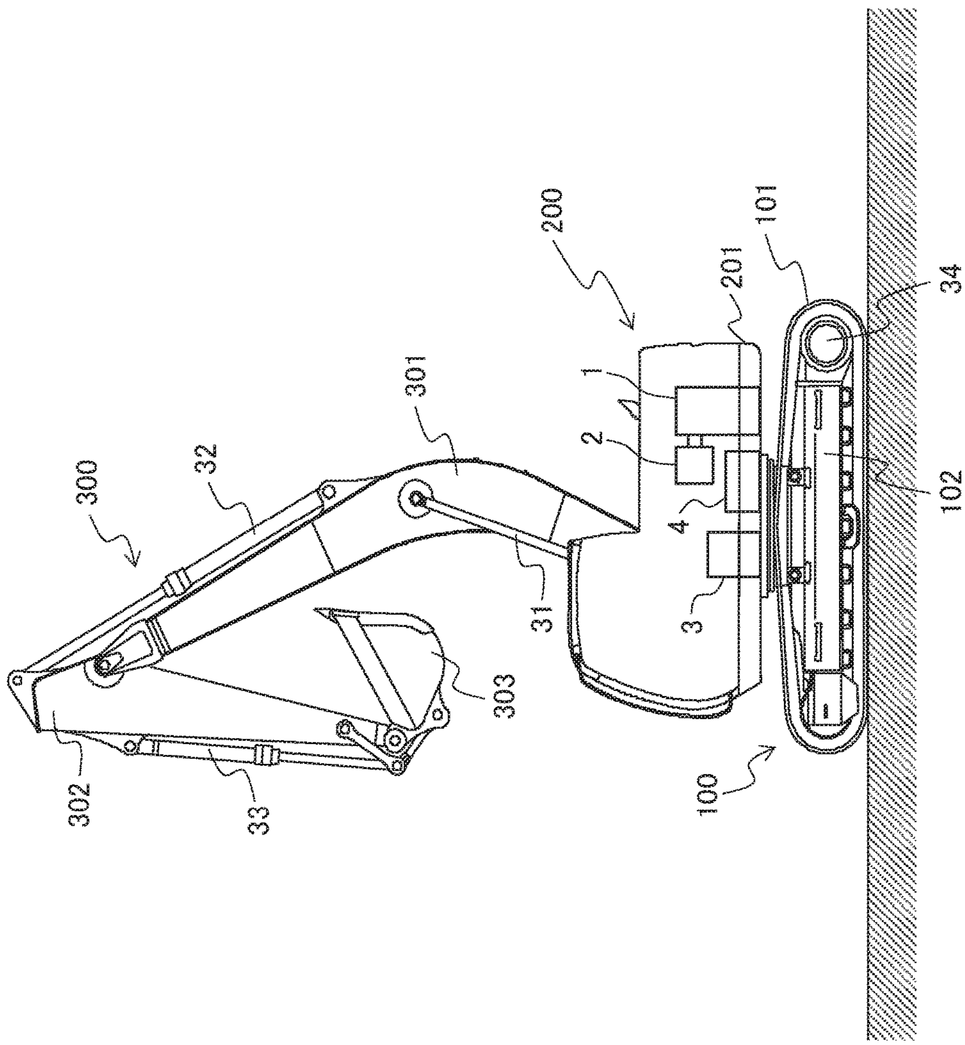
FIG. 1 is a diagram showing the external appearance of a hydraulic excavator in an embodiment of the present invention.

Referring now to the drawings, a description will be given in detail of a preferred embodiment in accordance with the present invention.

Configuration

FIG. 1 is a diagram showing an external appearance of a hydraulic excavator as an example of a construction machine according to an embodiment of the present invention. In FIG. 1, the hydraulic actuator includes a lower track structure 100, an upper swing structure 200 and an excavation mechanism 300.

The lower track structure 100 includes a pair of crawlers 101 (only one side is illustrated), a pair of crawler frames 102 (only one side is illustrated), and a pair of travel hydraulic motors 34 (only one side is illustrated) each of which independently drives its respective crawler.

The upper swing structure 200 includes a swing frame 201. Mounted on the swing frame 201 are an engine 1 as a prime mover, a hydraulic pump 2 driven by the engine 1, a swing hydraulic motor 3 for driving and swinging the upper swing structure 200 (swing frame 201) with respect to the lower track structure 100, a control valve 4 for controlling the flow rate of the hydraulic fluid supplied from the hydraulic pump 2 to each hydraulic actuator, and so forth.

The excavation mechanism 300 includes a boom 301 attached to the upper swing structure 200 to be rotatable in the vertical direction, an arm 302 attached to the tip end of the boom 301 to be rotatable, and a bucket 303 attached to the tip end of the arm 302 to be rotatable. The boom 301 is rotated in the vertical direction by the expansion/contraction of a boom cylinder 31. The arm 302 is rotated in the vertical or longitudinal direction by the expansion/contraction of an arm cylinder 32. The bucket 303 is rotated in the vertical or longitudinal direction by the expansion/contraction of a bucket cylinder 33.

Figure 2:
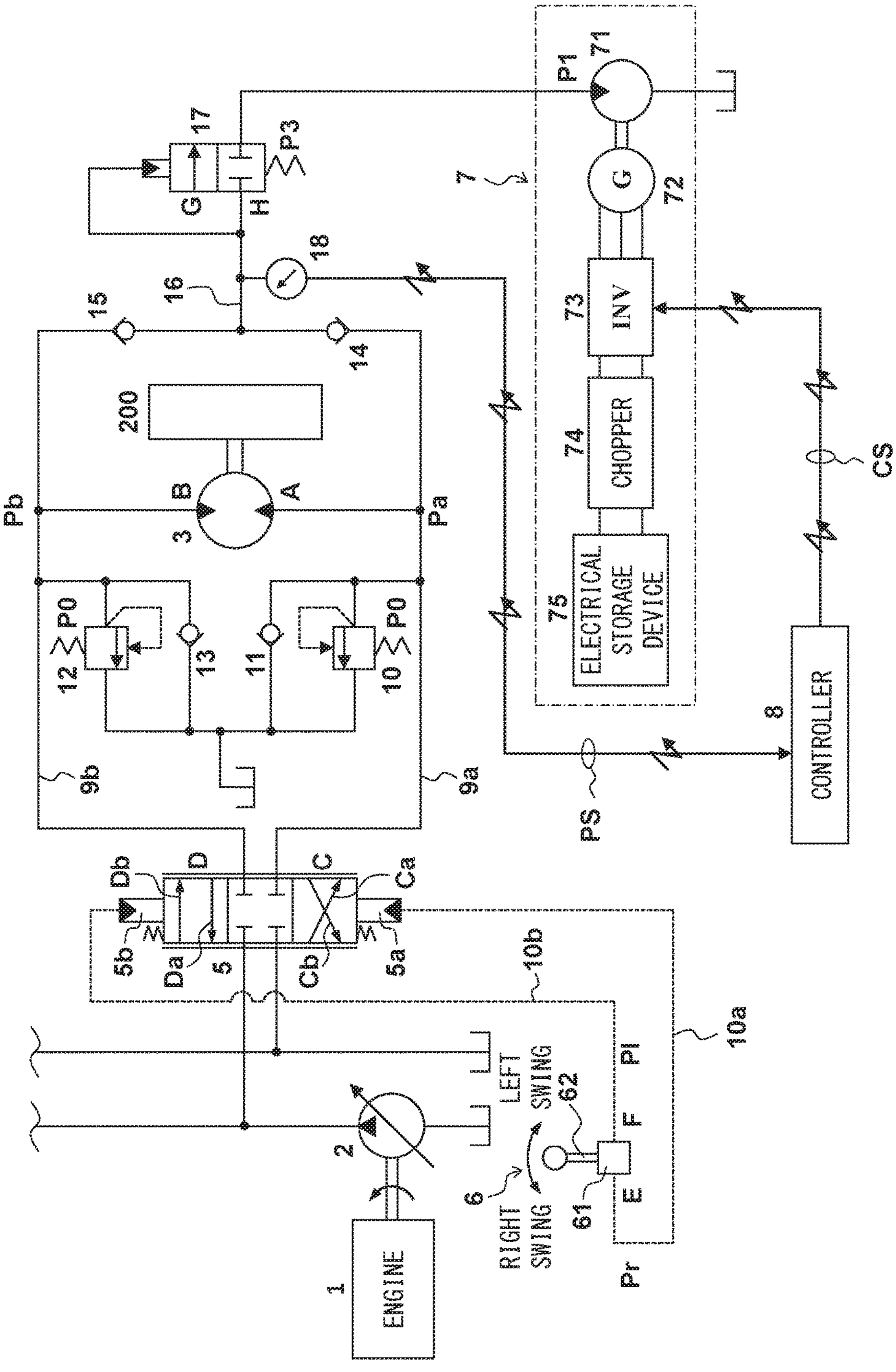
FIG. 2 is a diagram showing a hydraulic control system in the embodiment of the present invention.

FIG. 2 is a diagram showing a configuration of a hydraulic control system on at related to the driving of the swing structure 200) installed in the construction machine shown in FIG. 1. In FIG. 2, the hydraulic control system includes the engine 1, the hydraulic pump 2, the swing hydraulic motor 3, a spool valve 5 installed in the control valve 4 (shown in FIG. 1), a swing operating device 6, a regeneration device 7, and a controller 8 serving as a control unit.

The hydraulic pump 2 is connected to the swing hydraulic motor 3 via the spool valve 5 and a pair of actuator hydraulic lines 9*a* and 9*b*. When the spool valve 5 is operated from the illustrated neutral position to a position C's side, the hydraulic fluid delivered from the hydraulic pump 2 is supplied to a port A of the swing hydraulic motor 3 via a meter-in hydraulic line Ca formed at the position C of the spool valve 5 and the actuator hydraulic line 9*a* The hydraulic fluid supplied to the port A. of the swing hydraulic motor 3 is discharged through a port B and is returned to a tank via the actuator hydraulic line 9*b* and a meter-out hydraulic line Cb formed at the position C of the spool valve 5. Accordingly, the swing hydraulic motor 3 is rotationally driven in a right swing direction and the swing structure 200 performs a right swing operation.

In contrast, when the spool valve 5 is operated from the illustrated neutral position to a position D's side, the hydraulic fluid delivered from the hydraulic pump 2 is supplied to the port B of the swing hydraulic motor 3 via a meter-in hydraulic line Db formed at the position D of the spool valve 5 and the actuator hydraulic line 9*b*. The hydraulic fluid supplied to the port B of the swing hydraulic motor 3 is discharged through the port A and is returned to the tank via the actuator hydraulic line 9*a* and a meter-out hydraulic line Da formed at the position D of the spool valve 5. Accordingly, the swing hydraulic motor 3 is rotationally driven in a left swing direction and the swing structure 200 performs a left swing operation.

An overload relief valve 10 for discharging the hydraulic fluid when internal pressure exceeds a relief start pressure P0 and a makeup valve 11 for refilling with the hydraulic fluid from the tank when the internal pressure becomes negative are connected to the actuator hydraulic line 9*a*. An overload relief valve 12 for discharging the hydraulic fluid when internal pressure exceeds a relief start pressure P0 and a makeup valve 13 for refilling with the hydraulic fluid from the tank when the internal pressure becomes negative are connected to the actuator hydraulic line 9*b*.

The swing operating device 6 includes a pilot valve 61 and a control lever 62 attached to the pilot valve 61. The pilot valve 61 generates pilot pressure corresponding to the operation amount of the control lever 62. Output ports E and F of the pilot valve 61 are respectively connected to pilot pressure-receiving parts 5*a* and 5*b* of the spool valve 5 via pilot hydraulic lines 10*a* and 10*b*. Pilot pressure Pr generated when the control lever 62 is operated to a right swing side is led to the pilot pressure-receiving part 5*a* of the spool valve 5 via the pilot hydraulic line 10*a* and operates the spool valve 5 to the position C's side. Pilot pressure P1 generated when the control lever 62 is operated to a left swing side is led to the pilot pressure-receiving part 5*b* of the spool valve 5 via the pilot hydraulic line 10*b* and operates the spool valve 5 to the position D's side.

The regeneration device 7 includes a regeneration hydraulic line 16, a regenerative hydraulic motor 71, a generator/motor 72, an inverter 73, a chopper 74 and an electrical storage device 75.

The regeneration hydraulic line 16 is connected to the actuator hydraulic lines 9*a* and 9*b* via check valves 14 and 15, respectively. The regenerative hydraulic motor 71 is connected to the regeneration hydraulic line 16. The check valves 14 and 15 are arranged to exclusively allow the flow of the hydraulic fluid heading from the actuator hydraulic lines 9*a* and 9*b* to the regeneration hydraulic line 16. The regenerative hydraulic motor 71 is rotationally driven by the hydraulic fluid on a high-pressure side of the actuator hydraulic lines 9*a* and 9*b* supplied selectively via the check valves 14 and 15.

The generator/motor 72 is directly connected to the regenerative hydraulic motor 71 and generates electric power by rotating together with the regenerative hydraulic motor 71. The revolution speed of the generator/motor 72 is controlled via the inverter 73. Accordingly, the revolution speed of the regenerative hydraulic motor 71 is controlled and the flow rate of the hydraulic fluid recovered via the regeneration hydraulic line 16 is adjusted. The electric power generated by the generator/motor 72 is boosted in voltage by the chopper 74 and stored in the electrical storage device 75.

A selector valve 17 switchable between a communication position G and an blockage position H is arranged in the regeneration hydraulic line 16. When the pressure on the upstream side of the selector valve 17 (pressure on the high-pressure side of the pair of actuator hydraulic lines 9*a* and 9*b*) rises to or above a set value P2 (third set value), the selector valve 17 switches to the communication position G and establishes communication through the regeneration hydraulic line 16. In contrast, when the pressure on the upstream side of the selector valve 17 falls below the set value P2, the selector valve 17 switches to the blockage position H and blocks the regeneration hydraulic line 16. Here, the set value P2 has been set at a value equivalent to or slightly lower than a set value P1 (explained later) for the regenerative hydraulic motor 71. Accordingly, when the regeneration device 7 fails and the regenerative hydraulic motor 71 cannot maintain pressure higher than or equal to the set pressure P2, the regenerative hydraulic motor 71 is disconnected from the actuator hydraulic lines 9*a* and 9*b*. Thus, even in failure of the regeneration device 7, the pressure in the actuator hydraulic lines 9*a* and 9*b* is maintained like that in the conventional construction machines and excellent operability equivalent to that in the conventional technology can be secured.

A pressure sensor 18 as a pressure detection device is arranged on the upstream side of the selector valve 17 in the regeneration hydraulic line 16. The pressure sensor 18 detects the pressure on the high-pressure side of the pair of actuator hydraulic lines 9*a* and 9*b* and outputs a pressure detection signal PS to the controller 8. Incidentally, the pressure detection device can be any type of device as long as the device is configured to be able to detect at least the pressure on the high-pressure side of the actuator hydraulic lines 9*a* and 9*b*. For example, the pressure detection device may be configured to detect both the pressure on the high-pressure side and the pressure on the low-pressure side by using pressure sensors respectively arranged in the actuator hydraulic lines 9*a* and 9*b* and the high-pressure side may be selected by the controller 8.

The controller 8 performs a prescribed arithmetic process (explained later) based on the pressure detection signal PS inputted from the pressure sensor 18 and outputs a revolution speed control signal CS for controlling the generator/motor 72 at a prescribed revolution speed to the inverter 73.

Control

Figure 3:
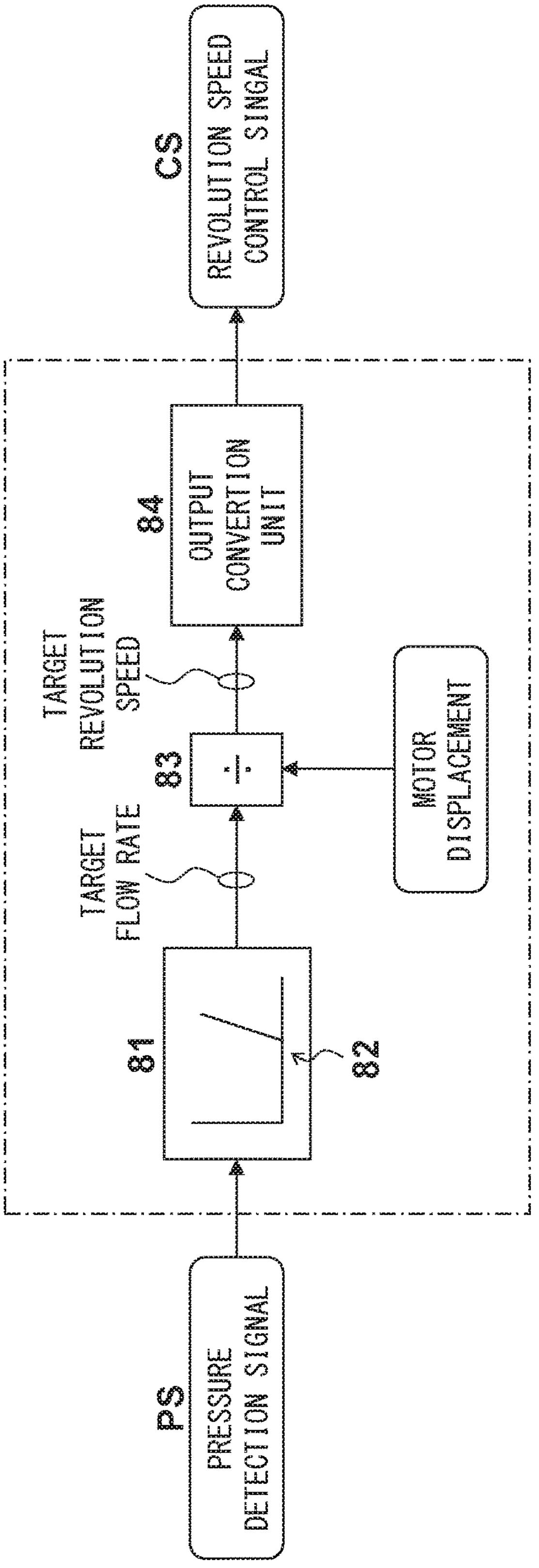
FIG. 3 is a diagram showing arithmetic logic of a controller in the embodiment of the present invention.

Next, the arithmetic process performed by the controller 8 will be explained below with reference to FIG. 3. FIG. 3 is a diagram showing arithmetic logic of the controller 8. In FIG. 3, the arithmetic logic of the controller 8 includes a target flow rate setting unit 81, a division unit 83 and an output conversion unit 84.

The target flow rate setting unit 81 sets a target flow rate corresponding to the pressure detection signal PS by referring to a preset conversion table 82 and outputs the target now rate to the division unit 83.

Figure 4:
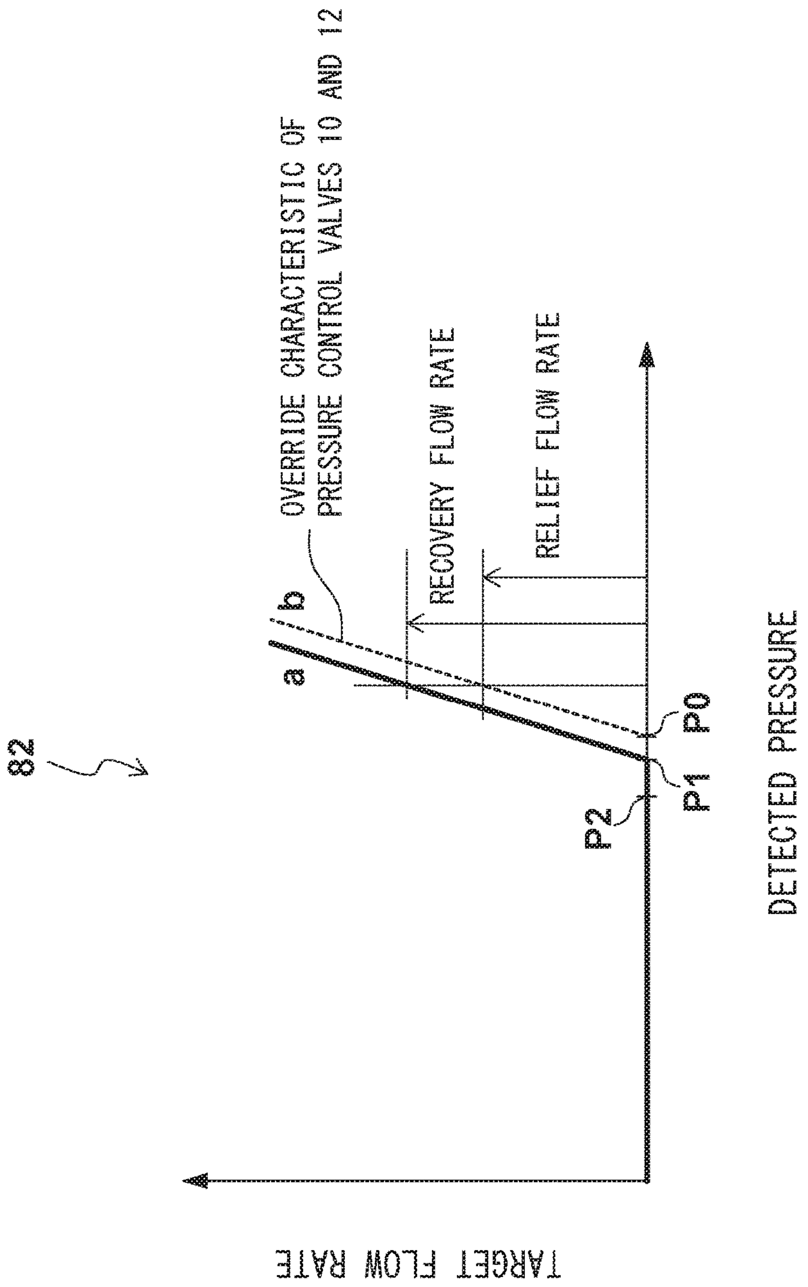
FIG. 4 is a diagram showing a relationship between pressure detected by a pressure sensor and a target flow rate of a regenerative hydraulic motor in the embodiment of the present invention.

Here, details of the conversion table 82 in FIG. 3 are shown in FIG. 4. In FIG. 4, the conversion table 82, including a pressure flow rate characteristic (indicated by a solid line a) correlating the pressure in the regeneration hydraulic line 16 (the pressure on the high-pressure side of the pair of actuator hydraulic lines 9*a* and 9*b*) with the target now rate of the regenerative hydraulic motor 71, is previously stored in a memory in the controller 8, for example. The broken line b in the figure represents an override characteristic of the overload relief valves 10 and 12. The set value P1 (first set value) at which the regenerative hydraulic motor 71 starts the recovery of the hydraulic fluid has been set at a value equivalent to or slightly lower than a relief start pressure P0 of the overload relief valves 10 and 12. The set value P2 of the selector valve 17 (shown in FIG. 2) has been set at a value equivalent to or slightly lower than the set value P1 as mentioned earlier. Further, in the pressure flow rate characteristic a, the rate of change of the target flow rate (gradient of the solid line a) when the pressure in the regeneration hydraulic line 16 exceeds the set value P1 has been set by simulating the override characteristic of the overload relief valves 10 and 12 (gradient of the broken line b). With such features, the target flow rate is constantly set to be equivalent to or higher than the relief flow rate. Therefore, the regeneration efficiency of the regeneration device 7 can be increased. Incidentally, in the pressure flow rate characteristic a, the rate of change of the target flow rate (gradient of the solid line a) when the pressure in the regeneration hydraulic line 16 is higher than or equal to the set value P1 does not necessarily have to be set by simulating the override characteristic (gradient of the broken line b); the rate of change of the target flow rate may also be set to be more gradual than the gradient of the broken line b. Further, the target flow rate when the pressure in the regeneration hydraulic line 16 is lower than or equal to the set value P1 is not limited to zero but can also be set at a low flow rate within an extent in which the hydraulic pressure in the regeneration hydraulic line 16 does not become negative pressure. With such a setting, even when the hydraulic pressure in the regeneration hydraulic line 16 is lower than or equal to the set pressure P1, the regeneration can be performed while securing excellent operability and the regeneration efficiency of the hydraulic fluid energy can be increased.

Returning to FIG. 3, the division unit 83 calculates the target revolution speed of the generator/motor 72 by dividing the target flow rate inputted from the target flow rate setting unit 81 by a motor displacement (flow rate per revolution of the regenerative hydraulic motor 71) and outputs the target revolution speed to the output conversion unit 84. The output conversion unit 84 converts the target revolution speed inputted from the division unit 83 into the revolution speed control signal CS for the generator/motor 72 and outputs the revolution speed control signal CS to the inverter 73. With this control, the revolution speed of the generator/motor 72 is controlled at the target revolution speed and the flow rate through the regenerative hydraulic motor 71 is adjusted to the target flow rate.

Operation

The operation of the hydraulic control system according to this embodiment will be described below with reference to FIG. 2.

First, the operation at the time of activating the swing structure 200 will be explained. Since the operation when the control lever 62 is operated to the right swing side and the operation when the control lever 62 is operated to the left swing side are equivalent to each other except for the left-right inversion, the following explanation will be given only of a case where the control lever 62 is operated to the right swing side.

When the control lever 62 is operated from the neutral position to the right swing side, the pilot pressure Pr outputted from the pilot valve 61 is led to the pilot pressure-receiving part 5*a* of the spool valve 5, by which the spool valve 5 is switched to the position C's side. Accordingly, the hydraulic fluid delivered from the hydraulic pump 2 is supplied to the port A of the swing hydraulic motor 3 via the meter-in hydraulic line Ca and the actuator hydraulic line 9*a* The hydraulic fluid supplied to the port A is discharged through the port B and is returned to the tank via the actuator hydraulic line 9*b* and the meter-out hydraulic line Cb. By this operation, the swing hydraulic motor 3 is rotationally driven in the right swing direction and the swing structure 200 starts the right swing operation.

Here, the swing structure 200 has high inertia Thus, at the start of the swinging, the flow of the hydraulic fluid supplied from the hydraulic pump 2 to the actuator hydraulic line 9*a* cannot be fully absorbed by the port A of the swing hydraulic motor 3 and the pressure Pa in the actuator hydraulic line 9*a* rises sharply. When the pressure Pa rises to or above a set pressure P3 of the selector valve 17, the selector valve 17 switches to a position G and establishes communication through the regeneration hydraulic line 16. When the pressure Pa rises further to or above the set value P1, the regenerative hydraulic motor 71 starts the recovery of the hydraulic fluid. In this case, the pressure in the regeneration hydraulic line 16, which is held to be higher than or equal to the bet value P1 equivalent to or slightly lower than the relief start pressure P0 according to the pressure flow rate characteristic a (see FIG. 4), acts on the swing hydraulic motor 3 as drive pressure via the actuator hydraulic line 9*a*, by which the swing structure 200 is accelerated.

When the pressure Pa in the actuator hydraulic line 9*a* rises further to or above the relief start pressure P0 of the overload relief valve 10, the flow that cannot be absorbed by the port A of the swing hydraulic motor 3 is recovered by the regenerative hydraulic motor 71 while also being discharged through the overload relief valve 10. In this case, the flow rate through the regenerative hydraulic motor 71 is immediately adjusted to the target flow rate according to the pressure flow rate characteristic a (flow rate equivalent to or higher than the relief flow rate of the overload relief valve 10) by the revolution speed control of the generator/motor having high responsiveness.

With the increase in the right swing speed of the swing structure 200, the flow absorbed by the port A of the swing hydraulic motor 3 increases and the pressure Pa in the actuator hydraulic line 9*a* decreases. When the pressure Pa falls below the set value P1, the regenerative hydraulic motor 72 stops the recovery of the hydraulic fluid and all the flow supplied from the hydraulic pump 2 to the actuator hydraulic line 9*a* is absorbed by the port A of the swing hydraulic motor 3.

Next, the operation at the time of decelerating the swing structure 200 will be explained below.

When the control lever 62 is returned to the neutral position during the right swing operation of the swing structure 200, the spool valve 5 is switched to the neutral position, the supply/discharge of the hydraulic fluid to/from the actuator hydraulic lines 9*a* and 9*b* via the spool valve 5 becomes impossible, and the driving of the swing hydraulic motor 3 by the hydraulic fluid from the hydraulic pump 2 stops. On the other hand, the swing structure 200 having high inertia continues the right swing operation even after the driving by the swing hydraulic motor 3 is stopped. Accordingly, the swing hydraulic motor 3 is rotationally driven by the inertial force of the swing structure 200.

In this case, since the supply/discharge of the hydraulic fluid to/from the actuator hydraulic lines 9*a* and 9*b* via the spool valve 5 has become impossible, the pressure Pa on the port A's side of the swing hydraulic motor 3 (pressure in the actuator hydraulic line 9*a*) drops sharply while the pressure Pb on the port B's side (pressure in the actuator hydraulic line 9*b*) rises sharply. When the pressure Pa in the actuator hydraulic line 9*a* is about to become negative pressure, the actuator hydraulic line 9*a* is refilled with the hydraulic fluid via the makeup valve 11. When the pressure Pb in the actuator hydraulic line 9*b* rises to or above the set value P2, the selector valve 17 switches to the position G and establishes communication through the regeneration hydraulic line 16.

When the pressure Pb in the actuator hydraulic line 9*b* rises further to or above the set value P1, a certain amount of flow according to the pressure flow rate characteristic a shown in FIG. 4 is recovered by the regenerative hydraulic motor 71. In this case, the pressure in the regeneration hydraulic line 16, which is held to be higher than or equal to the set value P1 equivalent to or slightly lower than the relief start pressure P0 according to the pressure flow rate characteristic a, acts on the swing hydraulic motor 3 as braking pressure via the actuator hydraulic line 9*b*, and the swing structure 200 starts decelerating.

When the pressure Pb in the actuator hydraulic line 9*b* rises further to or above the set value P1 of the overload relief valve 12, the hydraulic fluid in the actuator hydraulic line 9*b* is recovered by the regenerative hydraulic motor 71 while also being discharged through the overload relief valve 12. In this case, the flow rate through the regenerative hydraulic motor 71 is immediately adjusted to the target flow rate according to the pressure flow rate characteristic a (flow rate equivalent to or higher than the relief flow rate of the overload relief valve 12) by the revolution speed control of the generator/motor 72 having high responsiveness.

Thereafter, with the deceleration of the swing structure 200, the discharge flow rate from the swing hydraulic motor 3 drops and the pressure Pb in the actuator hydraulic line 9*b* also drops. In this case, the flow rate through the regenerative hydraulic motor 71 is immediately adjusted to the target flow rate corresponding to the pressure Pb by the revolution speed control of the generator/motor 72 having high responsiveness. Thus, the pressure Pb in the actuator hydraulic line 9*b* is prevented from falling below the set value P1 in the swing deceleration and excellent operability can be secured.

Effect

In this embodiment configured as above, when the pressure in the actuator hydraulic lines 9*a* and 9*b* is lower than the set value P1 which has been set at a value equivalent to or slightly lower than the relief start pressure P0 of the overload relief valves 10 and 12, the target flow rate of the regenerative hydraulic motor 71 is set at zero or a low flow rate within an extent in which the hydraulic pressure in the regeneration hydraulic line does not become negative pressure according to the pressure flow rate characteristic a, and no hydraulic fluid is recovered from the actuator hydraulic lines 9*a* and 9*b*. Therefore, the pressure in the actuator hydraulic lines 9*a* and 9*b* does not drop and excellent operability equivalent to that in the conventional technology can be secured.

In contrast, when the pressure in the actuator hydraulic lines 9*a* and 9*b* exceeds the set value P1, the flow rate through the regenerative hydraulic motor 71 is immediately adjusted to the target flow rate corresponding to the pressure on the high-pressure side of the pair of actuator hydraulic lines 9*a* and 9*b* by the revolution speed control of the generator/motor having high responsiveness. Thus, the pressure on the high-pressure side of the pair of actuator hydraulic lines 9*a* and 9*b* is maintained to be higher than or equal to the bet value P1 at times of starting the swinging and decelerating the swinging, by which excellent operability equivalent to that in the conventional technology can be secured.

Further, the flow rate change rate when the pressure in the regeneration hydraulic line 16 exceeds the set value P1 is set to be equivalent to the flow rate change rate in the override characteristic of the overload relief valves 10 and 12. With this setting, the target flow rate of the regenerative hydraulic motor 71 is constantly set to be equivalent to or higher than the relief flow rate of the overload relief valves 10 and 12. Therefore, the regeneration efficiency of the hydraulic fluid energy can be increased.

Modification

Figure 5:
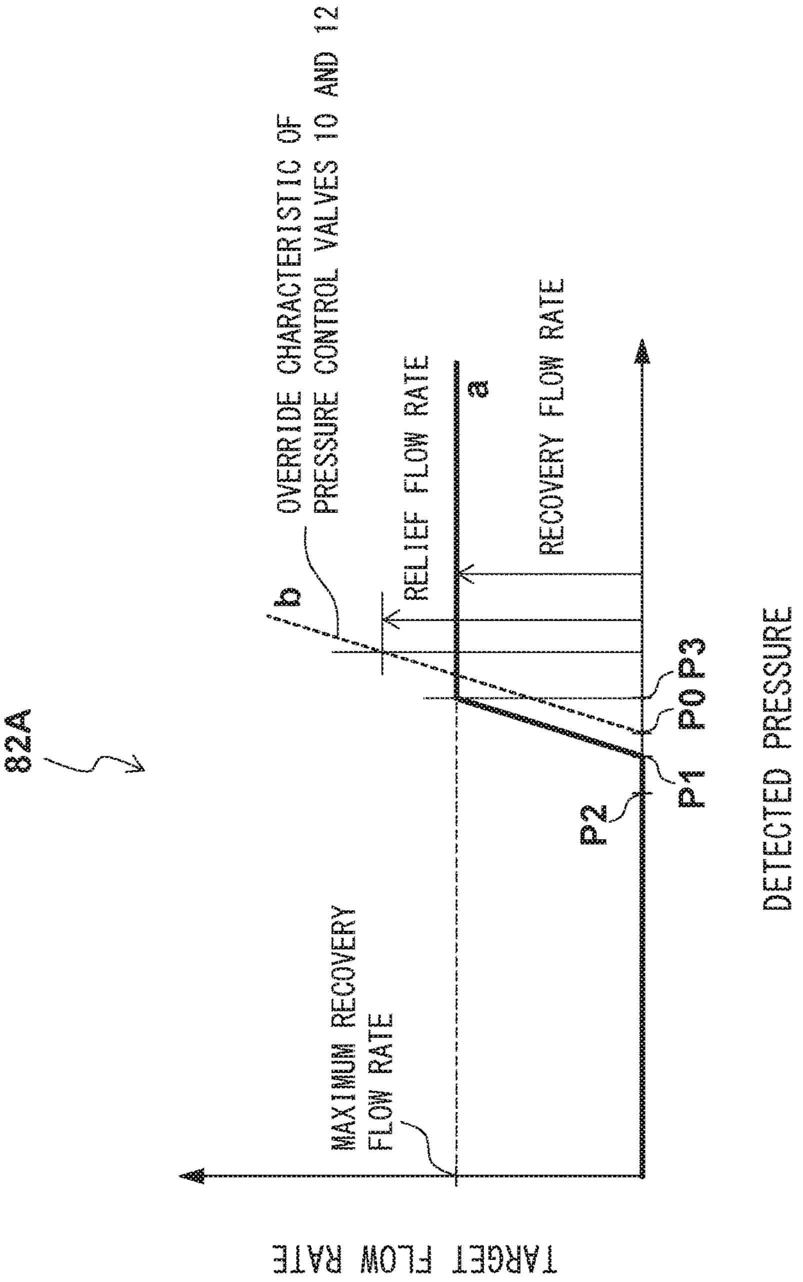
FIG. 5 is a diagram showing a relationship between the pressure detected by the pressure sensor and the target flow rate of the regenerative hydraulic motor in a modification of the embodiment of the present invention.

Incidentally, the target flow rate setting unit 81 shown in FIG. 3 may also be configured to refer to a conversion table 82A shown in FIG. 5 instead of the conversion table 82 shown in FIG. 4. The conversion table 82A differs from the conversion table 82 in that the target flow rate takes on a constant value when the detected pressure is higher than or equal to a set value P3 (second set value) that has been set higher than the set value P1.

With this setting, the flow rate through the regenerative hydraulic motor 71 is controlled to be constant when the pressure in the actuator hydraulic lines 9*a* and 9*b* is higher than or equal to the set value P3 that has been set higher than the set value P1. Therefore, pressure fluctuations in the actuator hydraulic lines 9*a* and 9*b* caused by flow rate fluctuation in the regenerative hydraulic motor 71 can be suppressed.

DESCRIPTION OF REFERENCE CHARACTERS

1: Engine (prime mover)
2: Hydraulic pump
3: Swing hydraulic motor
4: Control valve
5: Spool valve
5*a*, 5*b*: Pilot pressure-receiving parts
6: Swing operating device
7: Regeneration device
8: Controller (control unit)
9*a*, 9*b*: Actuator hydraulic lines
10*a*, 10*b*: Pilot hydraulic lines
10, 12: Overload relief valves
11, 13: Makeup valves
14, 15: Check valves
16: Regeneration hydraulic line
17: Selector valve
18: Pressure sensor
31: Boom cylinder
32: Arm cylinder
33: Bucket cylinder
34: Travel hydraulic motor
61: Pilot valve
62: Control lever
71: Regenerative hydraulic motor
72: Generator/motor
73: Inverter
74: Chopper
75: Electrical storage device
81: Target recovery flow rate setting unit
82: Conversion table
83: Division unit
84: Output conversion unit
100: Lower track structure
101: Crawler
102: Crawler frame
200: Upper swing structure
201: Swing frame
300: Excavation mechanism
301: Boom
302: Arm
303: Bucket

The invention claimed is:

1. A construction machine comprising:

a swing structure;

a swing hydraulic motor that rotationally drives the swing structure;

a regeneration device including a regeneration hydraulic line connected to a pair of actuator hydraulic lines for supplying and discharging hydraulic fluid for the swing hydraulic motor, a regenerative hydraulic motor connected to the regeneration hydraulic line, and a generator/motor that rotates together with the regenerative hydraulic motor;

a pressure detection device capable of detecting at least a pressure on a high-pressure side of the pair of actuator hydraulic lines;

overload relief valves connected to the actuator hydraulic lines; and a control unit that sets a target flow rate of the regenerative hydraulic motor at zero or a low flow rate within an extent in which hydraulic pressure in the regeneration hydraulic line does not become negative pressure when the detected pressure on the high-pressure side of the pair of actuator hydraulic lines detected by the pressure detection device is lower than a first set value previously set by the overload relief valves, sets the target flow rate of the regenerative hydraulic motor at a value corresponding to the detected pressure when the detected pressure is higher than or equal to the first set value, and controls a revolution speed of the generator/motor in such a manner that a flow rate through the regenerative hydraulic motor equals the target flow rate.

2. The construction machine according to claim 1, wherein the control unit sets the target flow rate when the detected pressure is higher than or equal to the first set value by simulating an override characteristic of the overload relief valves.

3. The construction machine according to claim 1, wherein the control unit sets the target flow rate of the regenerative hydraulic motor at a constant value when the detected pressure is higher than or equal to a second set value that has been set higher than the first set value.

4. The construction machine according to claim 1, further comprising a selector valve that is arranged in the regeneration hydraulic line, establishes communication through the regeneration hydraulic line when the pressure on the high-pressure side of the pair of actuator hydraulic lines is higher than or equal to a third set value that has been set equivalent to or lower than the first set value, and blocks the regeneration hydraulic line when the pressure on the high-pressure side of the pair of actuator hydraulic lines is lower than the third set value.

5. The construction machine according to claim 2, further comprising a selector valve that is arranged in the regeneration hydraulic line, establishes communication through the regeneration hydraulic line when the pressure on the high-pressure side of the pair of actuator hydraulic lines is higher than or equal to a third set value that has been set equivalent to or lower than the first set value, and blocks the regeneration hydraulic line when the pressure on the high-pressure side of the pair of actuator hydraulic lines is lower than the third set value.

6. The construction machine according to claim 3, further comprising a selector valve that is arranged in the regeneration hydraulic line, establishes communication through the regeneration hydraulic line when the pressure on the high-pressure side of the pair of actuator hydraulic lines is higher than or equal to a third set value that has been set equivalent to or lower than the first set value, and blocks the regeneration hydraulic line when the pressure on the high-pressure side of the pair of actuator hydraulic lines is lower than the third set value.

* * * * *